United States Patent [19]

Georgis

[11] Patent Number: 4,761,658
[45] Date of Patent: Aug. 2, 1988

[54] METHOD AND APPARATUS FOR MEASURING EXPERIMENTAL QUANTITIES USING AN INK JET IMPACTLESS TIMING DEVICE

[76] Inventor: Nicholas J. Georgis, 215 Fox Run, Huntington, Conn. 06484

[21] Appl. No.: 7,959

[22] Filed: Jan. 28, 1987

[51] Int. Cl.[4] ............. G01D 15/16; G09B 23/08
[52] U.S. Cl. ..................... 346/1.1; 346/71; 346/140 R; 346/33 R; 434/302
[58] Field of Search ............ 346/136, 140 R, 141, 346/71, 23, 20, 139, 1.1, 46, 93, 80, 78, 33 R; 434/300, 302

[56] References Cited

U.S. PATENT DOCUMENTS

| | | | |
|---|---|---|---|
| 2,925,312 | 2/1960 | Hollman | 346/130 |
| 3,281,859 | 10/1966 | Stone | 346/75 |
| 3,520,981 | 7/1970 | Chambers | 434/302 |
| 3,611,413 | 10/1971 | Lindsay | 346/71 |
| 3,719,952 | 3/1973 | Elbaum | 346/75 |
| 3,864,696 | 2/1975 | Fishbeck | 346/140 |
| 4,025,928 | 5/1977 | Hou et al. | 346/140 |
| 4,065,775 | 12/1977 | Hou et al. | 346/140 |
| 4,136,346 | 1/1979 | Parkinson | 346/140 |
| 4,313,124 | 1/1982 | Hara | 346/140 |
| 4,412,232 | 10/1983 | Weber et al. | 346/140 |
| 4,500,895 | 2/1985 | Buck | 346/140 |
| 4,503,437 | 3/1985 | Katzschner | 346/1.1 |
| 4,511,907 | 4/1985 | Fukuchi | 346/140 |
| 4,540,997 | 9/1985 | Biggs et al. | 361/228 |
| 4,549,243 | 10/1985 | Owen et al. | 346/140 |

OTHER PUBLICATIONS

Pages from Fischer Scientific Company Catalog.
Pages from Central Scientific Company Catalog.

*Primary Examiner*—Joseph W. Hartary
*Attorney, Agent, or Firm*—K. Bradford Adolphson

[57] ABSTRACT

A method and apparatus for measuring experimental quantities utilizes a self-contained ink jet impactless timing device including an ink jet head employing a timing circuit to provide a precisely timed ink dot stream. In utilizing the present invention, relative movement is initiated between the ink jet device in indicia receiving medium, generally ticker-tape paper, producing a dot pattern on the indicia receiving medium. The dot pattern, so produced, can be reviewed to obtain the experimental results. The invention can be utilized in various ways to measure the acceleration due to gravity, velocities, momentum, linear acceleration, period of a pendulum, motion of a spring, etc.

16 Claims, 2 Drawing Sheets

METHOD AND APPARATUS FOR MEASURING EXPERIMENTAL QUANTITIES USING AN INK JET IMPACTLESS TIMING DEVICE

BACKGROUND OF THE INVENTION

The present invention relates generally to a method and apparatus for measuring experimental quantities and, more particularly, to a method and apparatus for use in physics experiments for measuring experimental quantities, such as acceleration due to gravity, velocities, momentum, linear acceleration, period of a pendulum, motion of a spring, etc.

Prior art devices used in middle school to college level physics experiments to measure experimental quantities, such as acceleration, velocity, momentum, etc., use ticker-tape impact timing vibrators to measure the relative motion between a ticker tape and the ticker-tape vibrator. The ticker-tape vibrator employs electromagnetic principles as an energized induction coil momentarily magnitizes a strip of spring steel in the form of a blade which moves up and down in a regular manner. The blade makes contact with a carbon disc which is pressed against a strip of ticker tape. Each time the blade hits the carbon paper disk, a mark is printed on the ticker tape. If the ticker tape and ticker-tape vibrator are moved relative to one another, marks are printed on the ticker tape at regular intervals of time. Such timing vibrators can also use rotary action rather than reciprocating rectilinear motion as described.

These prior art devices have numerous drawbacks in that they can easily overheat if used for extended periods of time and produce a substantial quantity of noise. Additionally, hysteresis effects on the metal parts of the timing vibrators cause unsatisfactory experimental results. Furthermore, the carbon paper disks do not have a long service life, as they wear out quite quickly. More importantly, the impact of the blade on the ticker tape causes a drag effect therebetween with obvious adverse effects on the experimental results.

Another prior art timing device utilizes high induction coils to produce sparks which mark specially treated paper. The experimental capabilities of this device are limited by its weight and design.

The present invention is designed to overcome the above noted limitations that are attendant upon the use of the "prior art" devices, and toward this end, it contemplates the provision of a novel method and apparatus for measuring experimental quantities which utilizes a self-contained impactless timing device.

It is an object to provide such a device which produces little or no heat and may be operated for many hours without adversely affecting experimental results.

Still another object is to provide such a device which can be used with ordinary ticker tape paper and does not need specially treated paper.

A further object is to provide such a device which can be completely self contained and used in a plurality of physics experiments.

It is a general aim of the invention to provide such a device which may be readily and economically fabricated and will enjoy long life in operation.

SUMMARY OF THE INVENTION

It has now been found that the foregoing and related objects can be readily attained in an apparatus for measuring experimental quantities having an impactless timing device with an ink jet head operationally connected to a timing circuit for producing an ink dot stream in which the ink dots are produced at uniform precisely timed intervals, an elongated indicia receiving tape located in the path of the ink dot stream, and means to produce a desired relative movement between the impactless timing device and the elongated indicia receiving tape when the impactless timing device is producing the ink dot stream whereby an ink dot pattern, which represents an experimental quantity, is produced on the elongated indicia receiving tape.

Desirably, the timing circuit includes two cross-connected monostables, each of the monostables being controlled by its own RC circuit. The timing circuit is capable of producing uniform precisely timed short pulses of current to heat small volumes of ink within the ink jet head and force them out of the ink jet head to produce the dot stream.

In the first embodiment of the apparatus, the means to produce a desired relative movement includes a runway and tape guide for the elongated indicia receiving tape for guiding the same adjacent the ink jet head whereby the elongated indicia receiving tape can be moved along the runway and tape guide relative to the ink jet head, which is held stationary, in the path of the ink dot stream.

In the second embodiment of the apparatus, the means to produce a desired relative movement includes a dynamics cart upon which the impactless timing device is mounted and means to move the cart and impactless timing device relative to the elongated indicia receiving tape.

The above-described apparatus can be used to perform the method of the present invention for measuring experimental quantities comprising the steps of providing the impactless timing device, with its ink jet head operationally connected to the timing circuit producing an ink dot stream in which the ink dots are produced at uniform precisely timed intervals, providing the elongated indicia receiving tape in the path of the ink dot stream, and producing a desired relative movement between the impactless timing device and the elongated indicia receiving tape whereby an ink dot pattern, which represents an experimental quantity, is produced on the elongated indicia receiving tape.

In using the first embodiment of the apparatus, the impactless timing device is maintained in a stationary position while the elongated indicia receiving tape is moved relative thereto to produce the desired relative movement. In using the second embodiment, the elongated indicia receiving tape is maintained in a stationary position while the impactless timing device is moved relative thereto to produce the desired relative movement.

The invention will be fully understood when reference is made to the following detailed description taken in conjunction with the accompanying drawings.

DETAILED DESCRIPTION OF THE INVENTION

Figure 1:
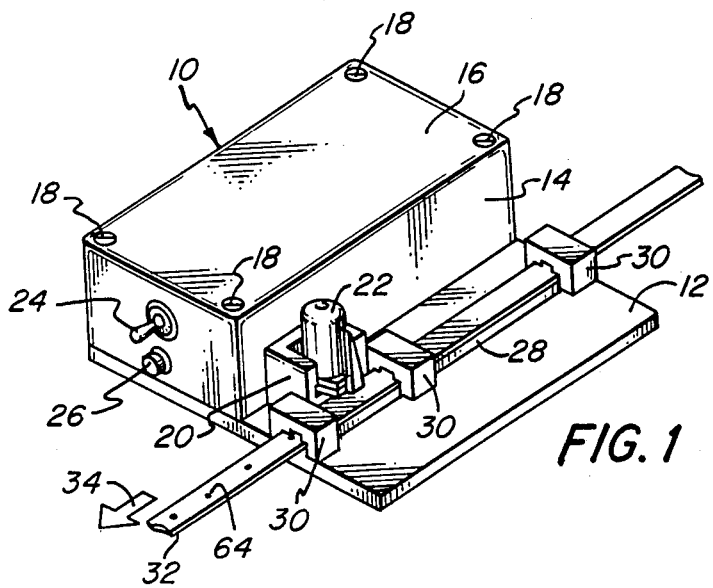
FIG. 1 is a perspective view of the first embodiment of the self-contained ink jet impactless timing device operating in accordance with the present invention.

Turning first to FIG. 1 of the drawings, therein illustrated is a self-contained ink jet impactless timing device embodying the present invention and generally designated by the numeral 10. The device 10 as illustrated is depicted performing the method of the present invention.

As shown in FIG. 1, the impactless timing device 10 is mounted off-center on a square base plate 12 and includes a rectangular housing 14 with a cover 16 releasably fastened thereto by four screws 18. The screws 18 permit access to the interior of the housing where the electronic circuitry of device 10 is mounted.

Disposed on one of the upstanding side walls of the housing 14 is a U-shaped ink jet head holder 20 in which is removably seated an ink jet head 22. Electrical leads (not shown) in the interior of the U-shaped ink jet head holder 20 electronically connect the ink jet head 22 to the electronic circuitry within the housing 14 of the device 10 when the ink jet head 22 is fully seated within its holder 20. Also, mounted on another side wall of the housing 14 is an on/off toggle switch 24 and an on/off light emitting diode indicator 26.

The ink jet head 22 is a conventional multiport system commercially available from the Hewlett-Packard Corporation, Houston, Tex., as their Model No. HP-92261A. The ink jet head 22 has its own reservoir of ink and is capable of generating ink droplets at rates varying from zero to approximately one thousand per second. While the ink jet head 22 is a multiport head, only one port will be used in generating droplets in the sequence desired by the present invention, as will be explained further hereinafter.

As can be seen in FIG. 1, a portion of the ink jet head 22 overhangs a raised elongated runway 28 securely mounted on the base 12. This overhanging portion of the ink jet head 22 contains the ports from which the ink droplets emanate and is spaced an appropriate operational distance from the runway 28.

Supported on the base plate 12 and extending transversely across the elongated runway 28 are three spaced-apart U-shaped paper guides 30. The paper guides 30 are spaced upwardly from the runway 28 to provide passageways for a strip of ticker-tape paper 32 in order to guide the same by the ink jet head 22 in the path of its ports when it is moving in the direction indicated by arrow 34.

The ink jet head 22 nominally requires a short pulse of current in order to heat a small volume of ink, thus increasing its volume and forcing ink out of the designated port of the ink jet head 22, thereby producing a droplet. In order to satisfy the requirements of the invention, a precisely timed droplet stream must be produced by the ink jet head 22 so the individual droplets are produced at constant time intervals. To accomplish this, the timing circuit shown in FIG. 2 generally indicated by numeral 36 is utilized. The circuit 36 is comprised of a pair of RC circuits 38 and 40 and two cross-connected monostables (specifically indicated by numerals 42 and 44 and generally indicated by numeral 46) producing wave forms as shown in FIGS. 4a–4d to drive the ink jet head portion 51 thereof in a manner and for a purpose that will be made clear hereinafter.

Figure 3:
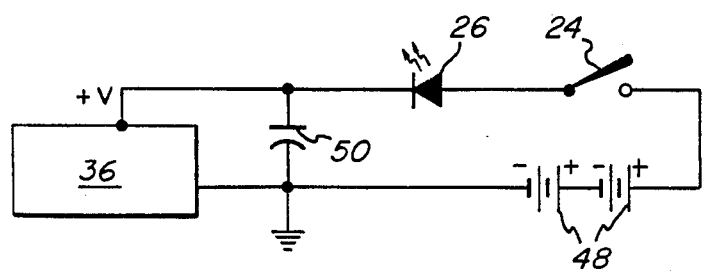
FIG. 3 is a schematic diagram of the power source for the circuit of FIG. 2.
Figure 4A:
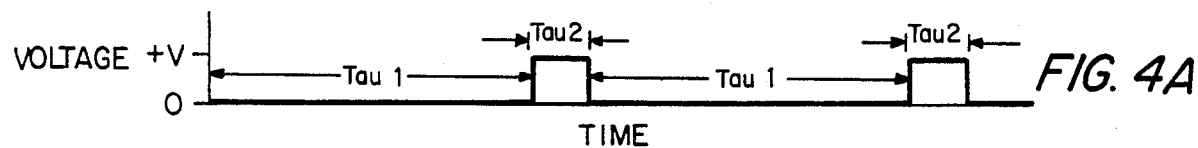
FIGS. 4a–4b are wave forms produced by the circuit of FIG. 2.
Figure 4B:
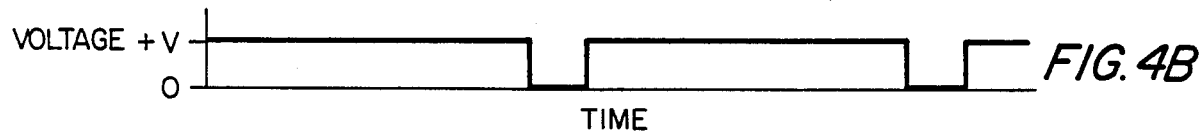
Figure 4C:
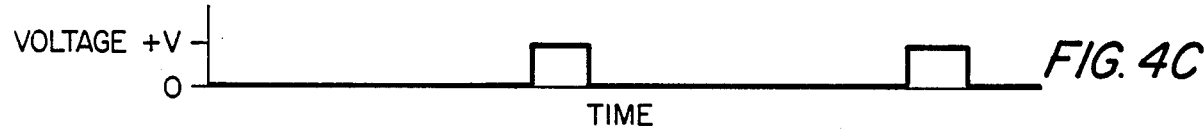
Figure 4D:

The power supply for the invention is shown in FIG. 3 and comprises a pair of batteries 48 connected through the on/off switch 24, on/off indicator 26, a capacitor 50 to the timing circuit 36 (RC circuit 38 and 40, cross-connected monostables 46 and ink jet head portion 51). The cross-connected monostables 46 can take the form of a conventional integrated chip available from the Motorola Corporation, Semiconductor Division, Phoenix, Ariz., Model No. CMOS-MC14528.

Referring to FIGS. 2 and 4a–4d, operation of the timing circuit of the present invention is readily apparent to the artisan skilled in the art. The graphic illustrations in FIGS. 4a–4d represent wave forms, in terms of voltage versus time, encountered in leads 52, 54, 56 and 58, respectively. Manual engagement of the on/off switch 24 to the "on" position energizes the operating circuit. Inputs A, B and C of monostable 42 are initially high, while its output $\bar{Q}$ is low. Concurrently, the RC circuit 38 is charging and when it reaches the trigger voltage for monostable 42 after a period tau 1 (see FIG. 4a), it discharges and switches Q of monostable 42 to high. Accordingly, inputs A, B and C of monostable 44 are high thereby switching Q of monostable 44 to high and $\bar{Q}$ to low. The low feedback from $\bar{Q}$ of monostable 44 to monostable 42 temporarily prevents further switching thereof. The RC circuit 40 connected to monostable 44 charges and switches monostable 44 after a period of tau 2. The output at Q of monostable 44 through lead 56 and resistor 60 is inverted by a transistor 62 so that current flows through ink jet head 22 during the period tau 2 and thereafter the cycle is continually repeated. As is well known in the art, these short pulses of current are sufficient to heat desired small volumes of ink within the ink jet head 22, thus increasing the volume, thereby forcing ink out of a small port of the ink jet head 22. The repetition rate of the timing circuit is determined by the following formula:

$$\text{tau} = RC = 0.2 \, RC \, \ln(+V-O)$$

For RC circuit 38 designed as follows:
R = 0.12 uf
C = 150 K
+V = 16 V
The value of tau 1 is:
tau 1 = 0.01 sec.
Thus the nominal period is 0.01 second, thus producing repetition rate of 100 Hertz or 100 droplets/sec.

The pulse duration (tau 2) is figured via the same formula. Using the following values for RC circuit 40:
R = 10 K
C = 1500 pf
+V = 16 volts
The value of tau 2 is:
tau 2 = 8 u sec.
Obviously, for this example, the pulse duration is exceedingly small compared to the nominal period.

In utilizing the device shown in FIG. 1, a variety of means can be used to provide relative movement, designated by the arrow 34, between the timing device 10 and the ticker-tape paper strip 32. In one example, the base 12 is clamped or otherwise secured in a vertical orientation so that the ticker-tape strip 32 can freely run through the paper guides 30 along the runway 28 in a vertical direction. The on/off switch 24 is turned to its "on" position energizing the ink jet head 22 to produce a dot stream from one of its ports. A weight (not shown) is attached to the end of the tape strip 32 and allowed to freely fall pulling the tape strip 32, as indicated by arrow 34, in the path of the dot stream of the ink jet head 22 so a dot pattern 64 is formed on the tape 32. By examining and measuring the dot pattern 64 on the tape strip 32 after the free fall operation, the acceleration due to gravity can be determined. Several experimental runs with different weights will confirm the constant value of acceleration due to gravity.

Figure 2:
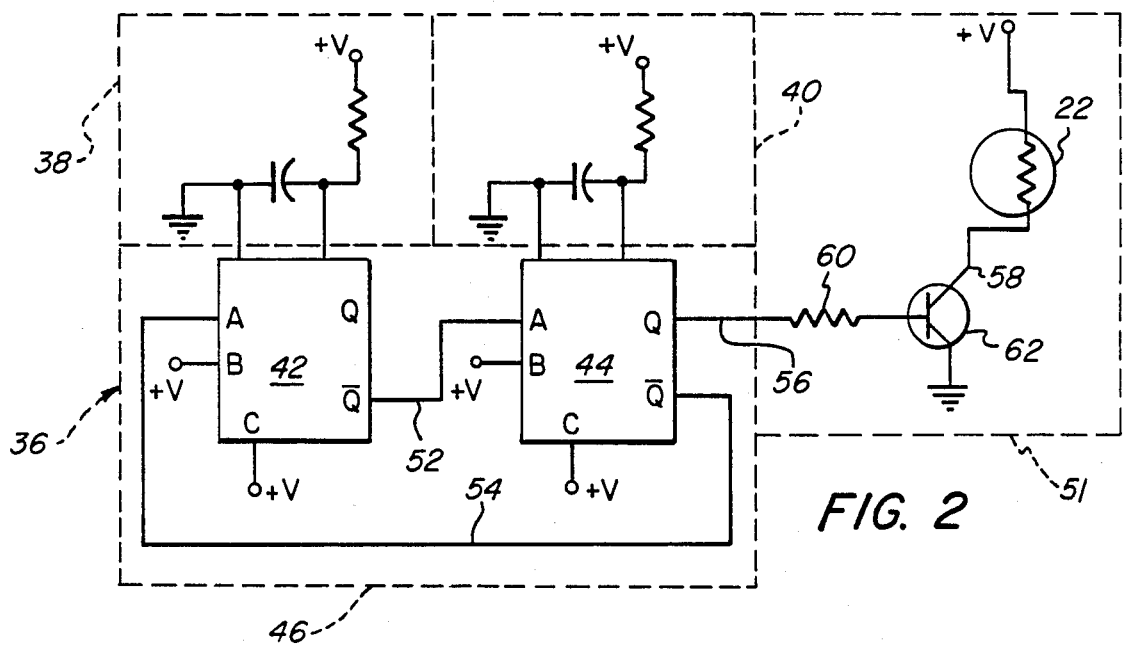
FIG. 2 is a schematic diagram of the timing circuit used in the present invention to control the ink jet stream.
Figure 5:
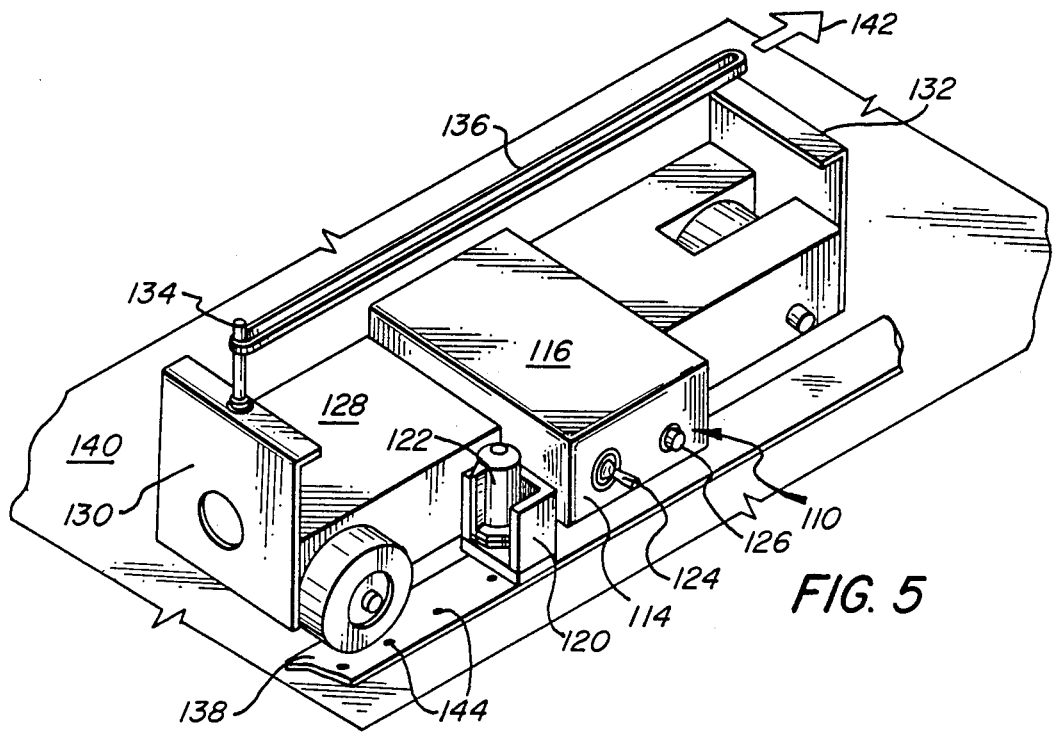
FIG. 5 is a perspective view of the second embodiment of the self-contained ink jet impactless timing device mounted on a three-wheeled dynamics cart operating in accordance with the present invention.

In FIG. 5, therein is illustrated a second embodiment of the invention utilizing a self-contained impactless ink jet timing device, generally indicated by numeral 110 and having a housing 114, cover 116, ink jet head holder 120, ink jet head 122, on/off toggle switch 124 and on/off indicator 126 (all similar to the comparable components described relative to the first embodiment). The timing device 110 uses the same timing circuit and power supply, as shown in FIGS. 2 and 3 and previously described with respect to the first embodiment. The timing device 110 is mounted in a cut out portion of the bed of a dynamics cart 128 which is of the conventional three-wheeled variety and has metal end supports 130 and 132 to hold auxiliary brick masses (not shown) when desired. The metal end support 130 includes an upstanding towing pin 134 to which is attached an elastic band 136.

In use, a strip of ticker-tape paper 138 is placed on a horizontal surface 140. Switching the on/off switch 124 to the "on" position and applying a constant force to the cart 128 by pulling on the elastic band 136, as indicated by arrow 142, to give it a constant extension, causes a dot pattern 144 to be formed on the ticker-tape strip 138. Examination of the pattern 144 so produced will reveal the relationship of force and acceleration (Force=mass×acceleration). Further, experimental runs can be made varying the mass by adding bricks or varying the force by adding more elastic bands.

Figure 6:
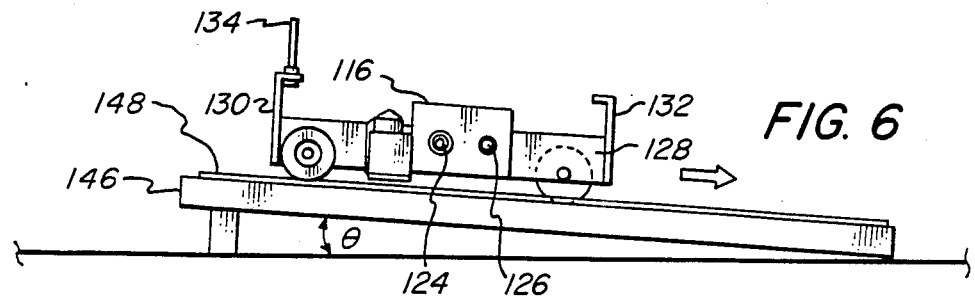
FIG. 6 is a side elevational view of the second embodiment of the self-contained ink jet impactless timing device operating in accordance with the present invention.

As seen in FIG. 6, the cart 128 with the impactless ink jet timing device 116 mounted thereon is placed on an inclined plane 146 which has ticker-tape strip 148 extended thereon. The plane 146 is inclined from the horizontal at an angle $\theta$. The device 116 is turned on utilizing toggle switch 124 to produce the desired dot stream of ink. The cart 128 will accelerate down the inclined plane 146 with a unique value of acceleration according to the following formula:

$$\text{acceleration of cart} = \text{acceleration due to gravity} \times \sin\theta$$

The experimental results can be obtained by examination of the ticker-tape strip 148 following the experimental run.

As will be appreciated by the artisans skilled in the art, the ink jet impactless timing device of the present invention can be employed in a variety of traditional physics experiments such as measuring acceleration due to gravity, velocities, momentum, linear acceleration, period of a pendulum, motion of a spring, etc.

It will, therefore, be seen from the above that my invention described above admirably achieves the objects of the invention; however, it will be appreciated that departures can be made by those skilled in the art without departing from the spirit and scope of the invention, which is limited only by the following claims.

Having thus described the invention, what is claimed is:

1. Method for measuring experimental quantities while performing a physics experiment such as measuring acceleration due to gravity, linear acceleration, changes in momentum acceleration down an inclined plane, period of a pendulum and motion of a spring comprising the steps of:
   (A) providing an impactless timing device, with an ink jet head operationally connected to timing circuit means, producing an ink dot stream in which the ink dots are produced at a constant, uniform, precisely timed frequency;
   (B) providing elongated indicia receiving means in the path of said ink dot stream; and
   (C) producing a desired relative movement between said impactless timing device and said elongated indicia receiving means, the desired relative movement being directly related into the experimental quantity being measured, thereby creating, when said impactless timing device is producing said ink dot stream, an ink dot pattern, which represents an experimental quantity, on said elongated indicia receiving means with the distance between the ink dots in the ink dot pattern on said elongated indicia receiving means being directly related to the experimental quantity being measured.

2. The method for measuring experimental quantities in accordance with claim 1 wherein said timing circuit is producing uniform precisely timed short pulses of current to heat small volumes of ink and force them out of said ink jet head thereby producing said dot stream.

3. The method for measuring experimental quantities in accordance with claim 2 wherein said timing circuit includes two cross-connected monostables, each of said monostables being controlled by its own RC circuit.

4. The method for measuring experimental quantities in accordance with claim 1 wherein said timing circuit includes two cross-connected monostables, each of said monostables being controlled by its own RC circuit.

5. The method for measuring experimental quantities in accordance with claim 1 wherein said producing step includes maintaining said impactless timing device stationary and moving said elongated indicia receiving means relative thereto to produce said desired relative movement.

6. The method for measuring experimental quantities in accordance with claim 1 wherein said producing step includes the steps of (1) providing a runway and guide means for said elongated indicia receiving means for guiding the same adjacent said ink jet head, (2) maintaining said impactless timing device stationary and (3) moving said elongated indicia receiving means along said runway and guide means relative to said ink jet head in the path of said ink dot stream.

7. The method for measuring experimental quantities in accordance with claim 1 wherein said producing step includes maintaining said elongated indicia receiving means stationary and moving said impactless timing device relative thereto to produce said desired relative movement.

8. The method for measuring experimental quantities in accordance with claim 1 wherein said producing step includes the steps of (1) providing a dynamics cart with said impactless timing device mounted thereon, (2)

maintaining said elongated indicia receiving means stationary and (3) moving said cart and said impactless timing relative to said stationary elongated indicia receiving means.

9. Apparatus for measuring experimental quantities while performing a physics experiment such as measuring acceleration due to gravity, linear acceleration, changes in momentum, acceleration down an inclined plane, period of pendulum and motion of a spring including:
  (A) an impactless timing device with an ink jet head operationally connected to timing circuit means for producing an ink dot stream in which the ink dots are produced at a constant, uniform, precisely timed frequency;
  (B) elongated indicia receiving means located in the path of said ink dot stream; and
  (C) means to produce a desired relative movement between said impactless timing device and said elongated indicia receiving means, the desired relative movement being directly related to the experimental quantity being measured, thereby creating, when said impactless timing device is producing said ink dot stream, an ink dot pattern, which represents an experimental quantity, on said elongated indicia receiving means with the distance between the ink dots in the ink dot pattern on said elongated indicia receiving means being directly related to the experimental quantity being measured.

10. The apparatus for measuring experimental quantities in accordance with claim 9 wherein said timing circuit is capable of producing uniform precisely timed short pulses of current to heat small volumes of ink within said ink jet head and force them out of said ink jet head to produce said dot stream.

11. The apparatus for measuring experimental quantities in accordance with claim 10 wherein said timing circuit includes two cross-connected monostables, each of said monostables being controlled by its own RC circuit.

12. The apparatus for measuring experimental quantities in accordance with claim 9 wherein said timing circuit includes two cross-connected monostables, each of said monostables being controlled by its own RC circuit.

13. The apparatus for measuring experimental quantities in accordance with claim 9 wherein said means to produce a desired relative movement includes means to maintain said impactless timing device stationary and means to move said elongated indicia receiving means relative thereto.

14. The apparatus for measuring experimental quantities in accordance with claim 9 wherein said means to produce a desired relative movement includes a runway and guide means for said elongated indicia receiving means for guiding the same adjacent said ink jet head whereby said elongated indicia receiving means can be moved along said runway and guide means relative to said ink jet head in the path of said ink dot stream.

15. The apparatus for measuring experimental quantities in accordance with claim 9 wherein said means to produce a desired relative movement includes means to maintain said elongated indicia receiving means stationary and means to move said impactless timing device relative thereto.

16. The apparatus for measuring experimental quantities in accordance with claim 9 wherein said means to produce a desired relative movement includes a dynamics cart upon which said impactless timing device is mounted and means to move said cart and said impactless timing device relative to said elongated indicia receiving means.

* * * * *

UNITED STATES PATENT AND TRADEMARK OFFICE
CERTIFICATE OF CORRECTION

PATENT NO. : 4,761,658

DATED : August 2, 1988

INVENTOR(S) : Nicholas J. Georgis

It is certified that error appears in the above-identified patent and that said Letters Patent is hereby corrected as shown below:

Column 6, lines 23-25 (claim 1), the following is deleted:
", when said impactless timing device is producing said ink dot stream,".

Signed and Sealed this

Thirteenth Day of December, 1988

Attest:

DONALD J. QUIGG

Attesting Officer

Commissioner of Patents and Trademarks